No. 633,440. Patented Sept. 19, 1899.
G. N. FARNSWORTH.
DRAFT APPLIANCE.
(Application filed May 15, 1899.)
(No Model.)

WITNESSES:

INVENTOR
George N. Farnsworth
BY
ATTORNEYS.

THE NORRIS PETERS CO., PHOTO-LITHO., WASHINGTON, D. C.

UNITED STATES PATENT OFFICE.

GEORGE NOBLE FARNSWORTH, OF GRIMES, CALIFORNIA.

DRAFT APPLIANCE.

SPECIFICATION forming part of Letters Patent No. 633,440, dated September 19, 1899.

Application filed May 15, 1899. Serial No. 716,850. (No model.)

*To all whom it may concern:*

Be it known that I, GEORGE NOBLE FARNSWORTH, of Grimes, in the county of Colusa and State of California, have invented a new and Improved Draft Appliance, of which the following is a full, clear, and exact description.

The draft appliance is especially designed for coupling one span of animals ahead of another span, either to draw agricultural implements or implements of any character.

The object of the invention is to so construct the draft appliance that should the feet of the animals get over the chains the feet will be turned or directed out naturally and of their own accord, thus obviating the present necessity of stopping the team and removing the feet of the animal by the hands of the driver.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both the figures.

Figure 1:
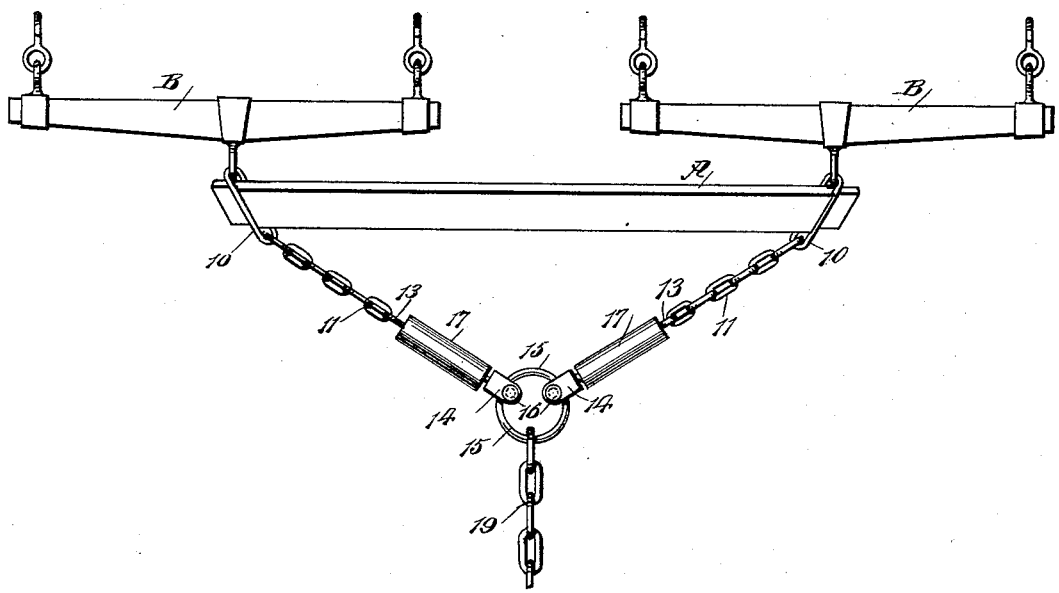
Figure 2:
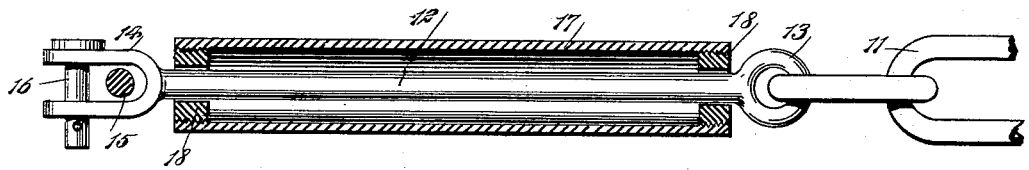

Figure 1 is a plan view of the improved draft appliance; and Fig. 2 is an enlarged longitudinal section through a roller employed in connection with the appliance, illustrating also the manner in which the support for the roller is attached to the other portions of the device.

The prime object in constructing the chains in the manner to be hereinafter described is to prevent interference with the teams, as where a team is coupled one span ahead of the other the rear horses on a turn will quite often step within the chains of the advance draft appliance, which necessitates stopping the team and freeing the feet of the animals by hand, whereas under the improved construction the misplaced foot or feet will be naturally withdrawn and placed in proper position when the advance appliance is placed under tension.

A represents a spreader-bar, and B singletrees attached to the spreader-bar in the customary manner. A link 10 is passed around the spreader-bar at each of its ends outside of the connection of the singletrees with said bar, and each link 10 carried by said spreader-bar A is connected with a length of chain 11. These chains may be properly designated as "stretcher-chains," and each chain 11 at its rear end is connected with a bar 12, and each of these bars is provided with an eye 13 at its forward end, receiving the rearmost link of a stretcher-chain 11, and with a fork 14 at its opposite or rear end, as shown in Fig. 2, and the fork of each bar 12 is adapted to receive between its members a fifth-chain ring 15, (shown particularly in Fig. 1,) the ring being held between the members of the forks 14 of said bars 12 by pins 16, passed through the members of the forks and suitably secured to place. A portion of a fifth chain 19 is shown connected with the ring 15.

Each bar 12 is provided with a roller 17. In fact, the bars 12 serve as axes for the rollers 17, and the rollers extend usually from the eyes 13 of the bars to their forks 14, and said rollers are preferably tubular and may be made from piping, in which event the rollers are provided with end caps 18, having suitable openings for the free passage of the bars 12, as is fully shown in Fig. 2.

When the advance team is on the turn, the traces and spreader-bar naturally drop to the ground, and it is then possible for the animals at the rear and following to step over the stretcher-chains, and when the chains are of ordinary construction and are again placed under tension when a straight stretch or row is reached the feet of the rear team are caught and must be released by hand, whereas when the rollers 17 are employed as soon as the draft appliance is again subjected to tension under like conditions the rollers, striking the misplaced feet, will cause the animal to lift its feet and the rollers will assist said releasing movement of the feet.

Having thus described my invention, I claim as new and desire to secure by Letters Patent—

1. In a draft appliance, a spreader-bar adapted for attachment to singletrees, stretcher-chains connected with the ends of the spreader-bar, each stretcher-chain being provided at a point in its length with a bar and a roller mounted to turn upon said bar, the bars being adapted for attachment to a fifth-chain ring, for the purpose specified.

2. In a draft appliance, a draft-chain comprising a bar attached to and forming a continuation of the links of the chain, and a roller mounted loosely on the bar for the purpose specified.

GEORGE NOBLE FARNSWORTH.

Witnesses:
VERNE E. MILLER,
U. W. BROWN.